(12) United States Patent
Menheere

(10) Patent No.: US 12,264,658 B2
(45) Date of Patent: Apr. 1, 2025

(54) OIL PUMP FOR GAS TURBINE ENGINE AND ASSOCIATED METHOD OF PUMPING OIL

(71) Applicant: PRATT & WHITNEY CANADA CORP., Longueuil (CA)

(72) Inventor: Dave Menheere, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 23 days.

(21) Appl. No.: 18/302,963

(22) Filed: Apr. 19, 2023

(65) Prior Publication Data
US 2024/0352890 A1    Oct. 24, 2024

(51) Int. Cl.
*F04B 1/1071*    (2020.01)
*F04B 1/0452*    (2020.01)
*F16N 13/02*    (2006.01)

(52) U.S. Cl.
CPC .......... *F04B 1/1071* (2013.01); *F04B 1/0452* (2013.01); *F16N 13/02* (2013.01)

(58) Field of Classification Search
CPC .......... F04B 1/107; F04B 1/1071; F04B 1/10; F04B 1/47; F04B 1/04–1136; F04B 27/0612; F16N 13/02
See application file for complete search history.

(56) References Cited

U.S. PATENT DOCUMENTS

| | | | | |
|---|---|---|---|---|
| 1,358,504 A | * | 11/1920 | Beijer | F04B 1/0426 91/493 |
| 1,526,343 A | * | 2/1925 | Jouanneaux | F04B 1/047 417/538 |
| 1,910,581 A | * | 5/1933 | Vickers | F04B 1/0452 137/55 |
| 2,209,224 A | * | 7/1940 | Ernst | F04B 1/047 91/498 |
| 2,868,136 A | * | 1/1959 | Benedek | F04B 49/24 417/270 |
| 3,273,511 A | * | 9/1966 | Eickmann | F04B 1/1072 91/496 |
| 5,769,611 A | | 6/1998 | Djordjevic | |
| 8,109,366 B2 | | 2/2012 | Yoshida et al. | |
| 2001/0048880 A1 | | 12/2001 | Herrmann et al. | |

FOREIGN PATENT DOCUMENTS

| | | | | |
|---|---|---|---|---|
| DE | 19514749 A1 | * | 10/1996 | F04B 1/1071 |
| DE | 19535661 C1 | * | 1/1997 | F04B 1/1071 |
| DE | 102005015905 A1 | | 10/2006 | |

(Continued)

*Primary Examiner* — Thomas Fink
(74) *Attorney, Agent, or Firm* — Norton Rose Fulbright Canada LLP

(57) ABSTRACT

The pump can have a support having a guide extending around an axis, a radial position of the guide relative the axis varying around the axis, and a first oil passage formed in the support; a rotary assembly mounted to the support via support bearings, and rotatable around the axis, the rotary assembly having a second oil passage and a cylinder, the cylinder extending radially relative the axis, an inlet port fluidly connecting the first oil passage to the cylinder, and an outlet port fluidly connecting the cylinder to the second oil passage, and a piston slidingly mounted in the cylinder, a radially-outer end of the piston further slidingly engaged with the guide.

5 Claims, 7 Drawing Sheets

(56) References Cited

FOREIGN PATENT DOCUMENTS

| | | | |
|---|---|---|---|
| EP | 3786428 | A1 | 3/2021 |
| FR | 563834 | A | 12/1923 |
| FR | 2359277 | A1 | 2/1978 |
| JP | 4946818 | | 6/2009 |
| SE | 335477 | B | 5/1971 |

* cited by examiner

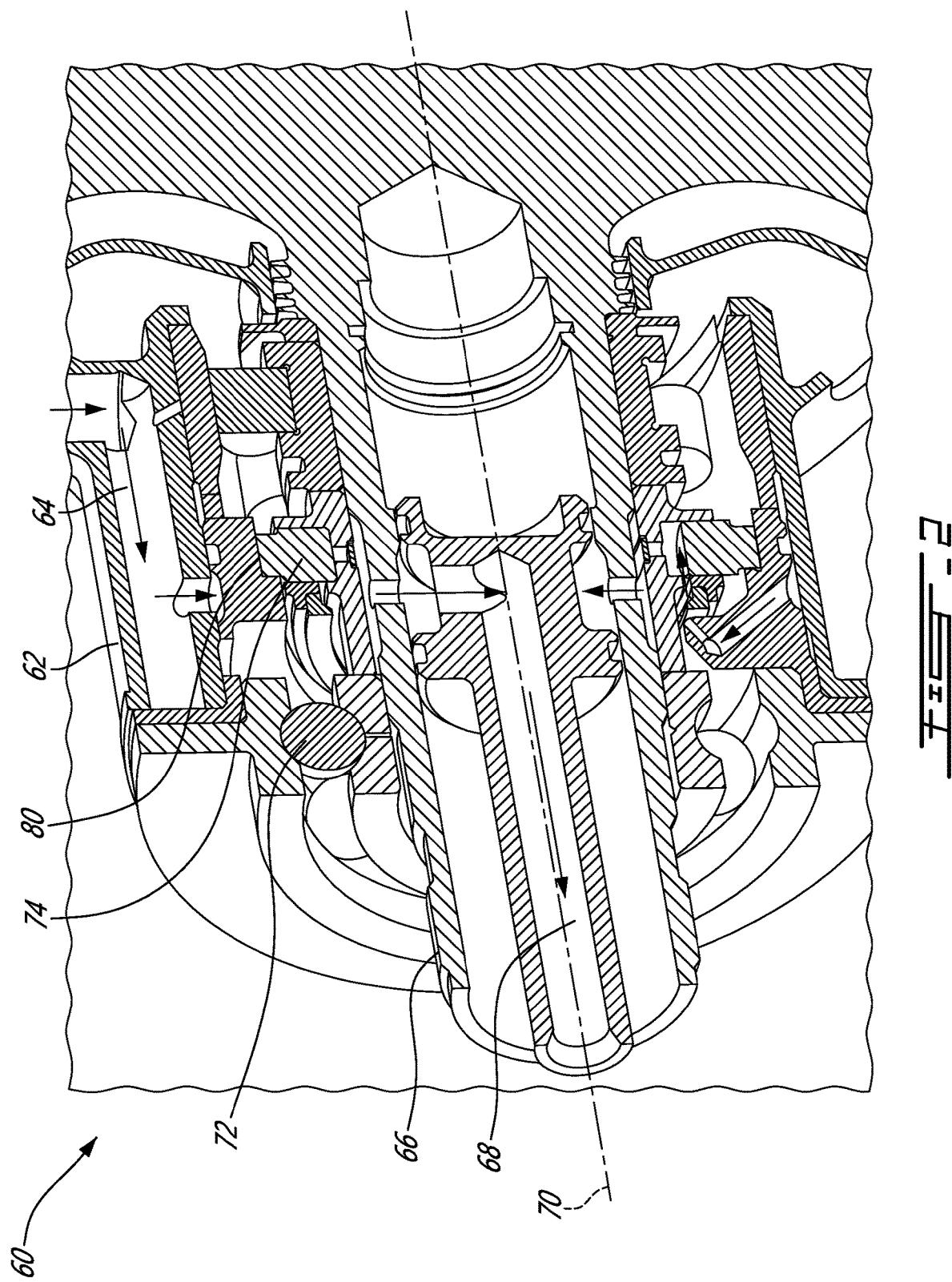

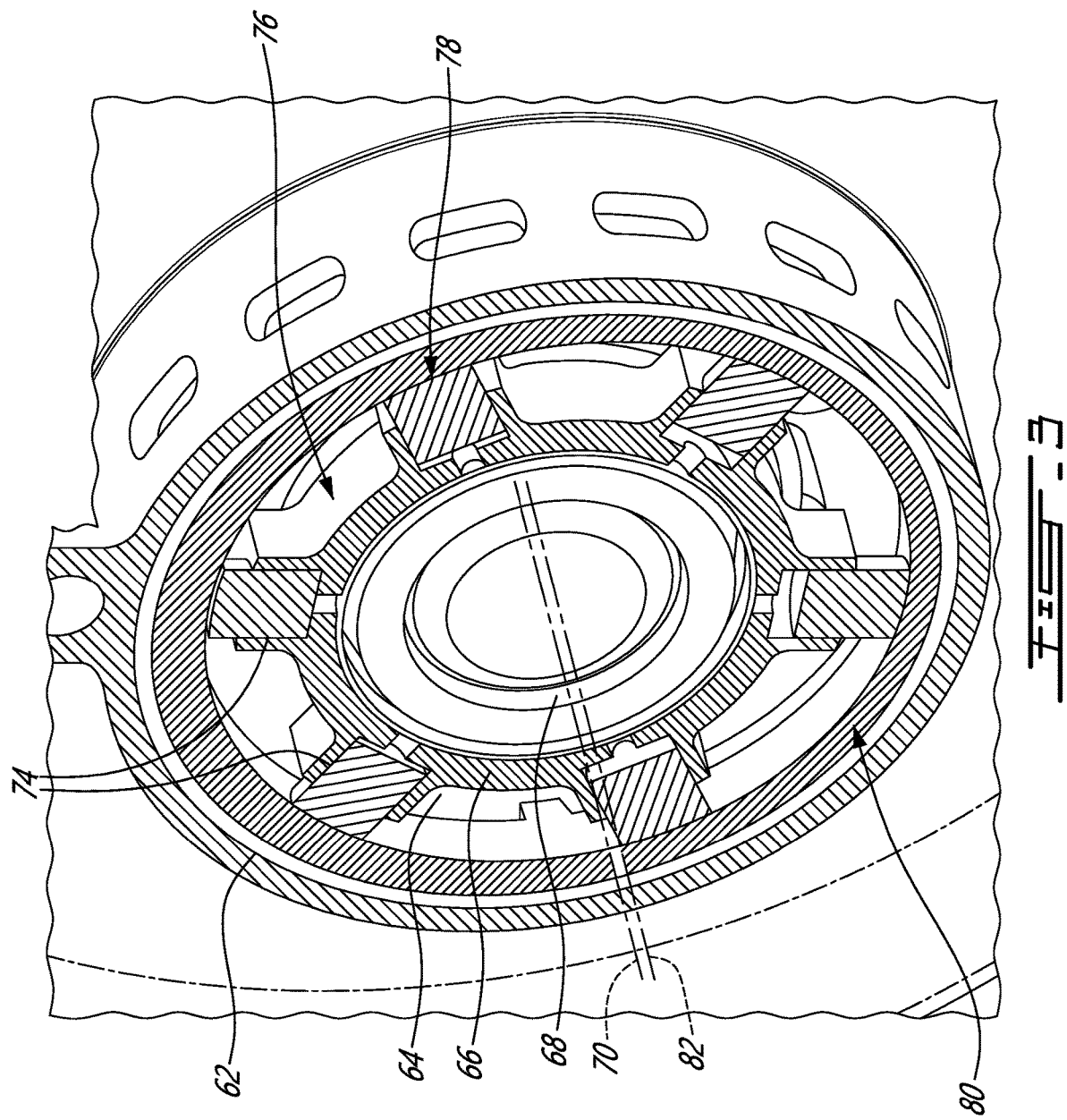

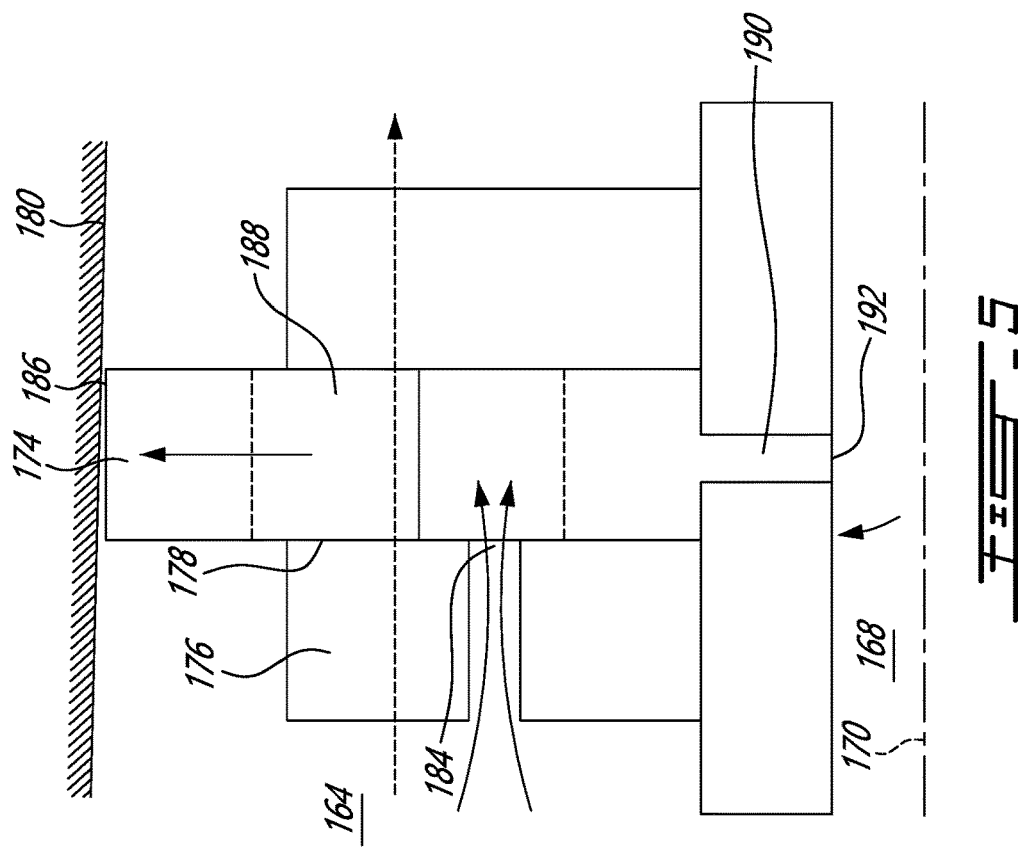
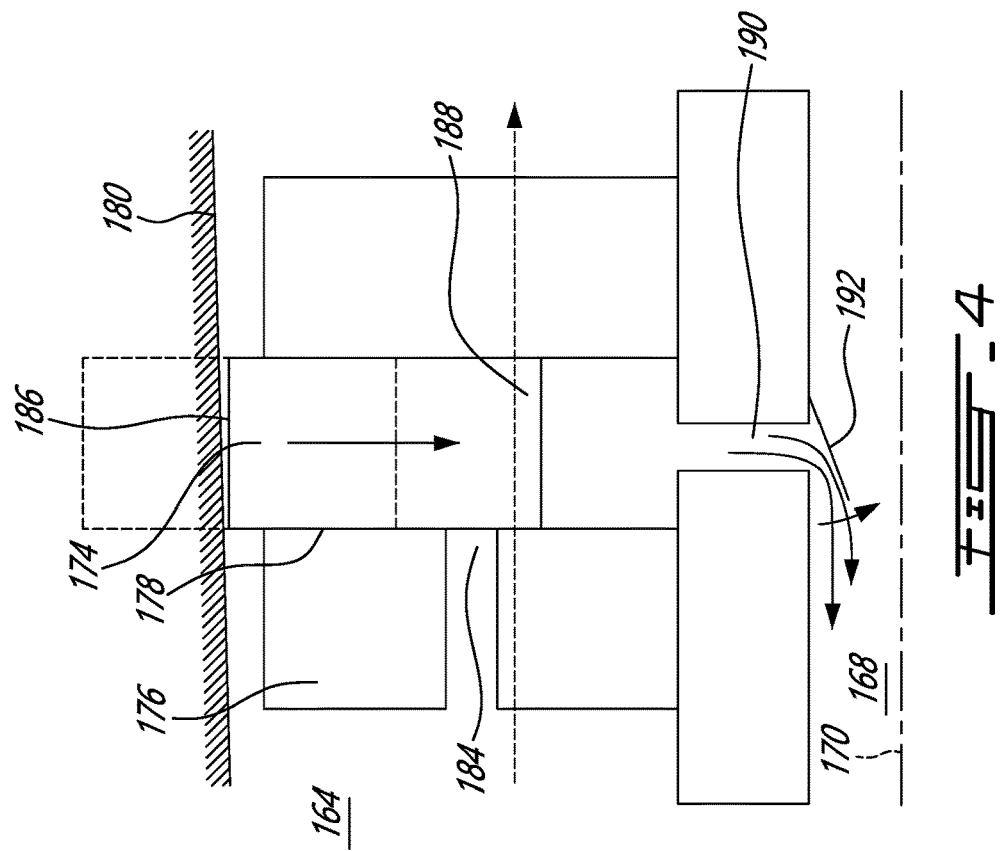

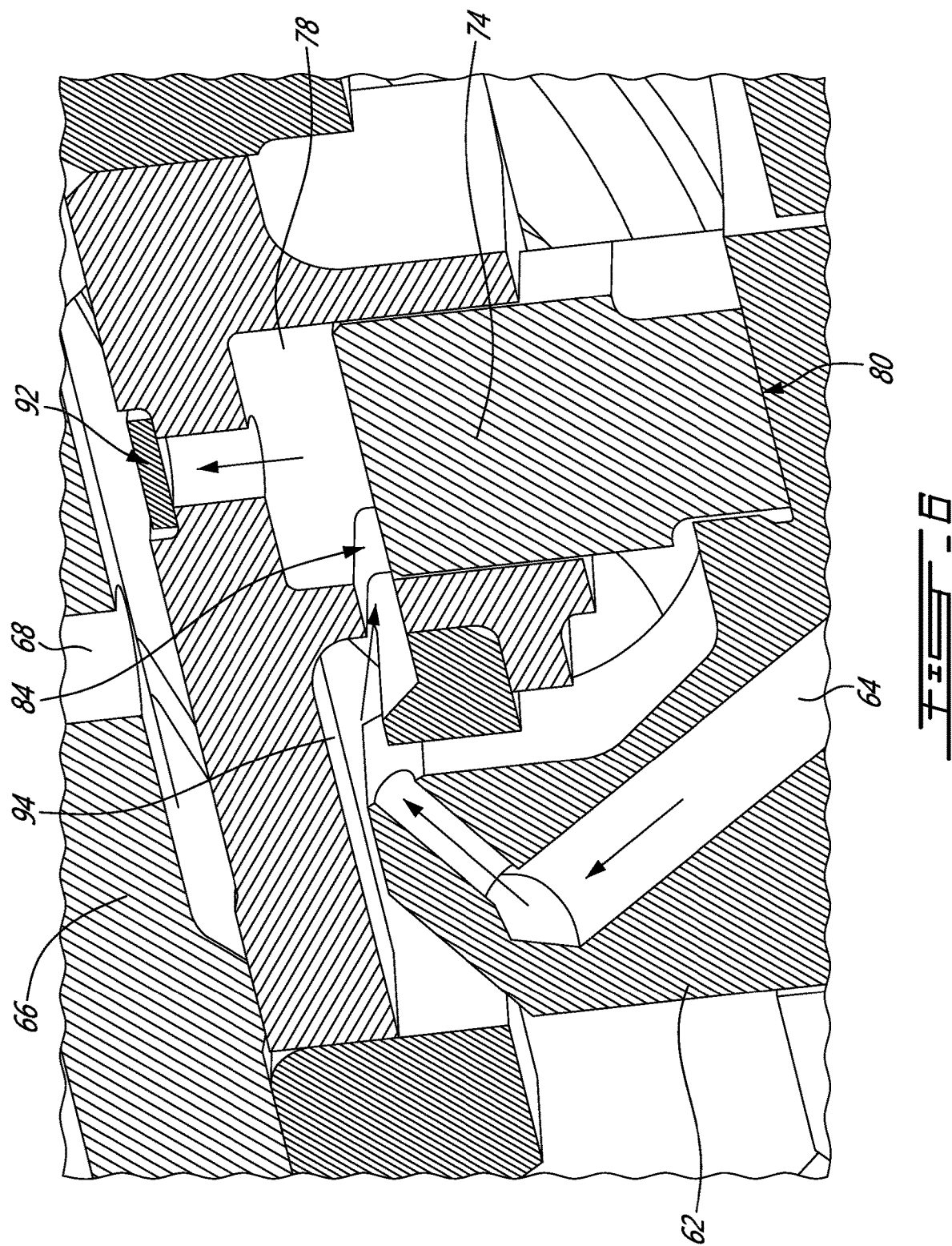

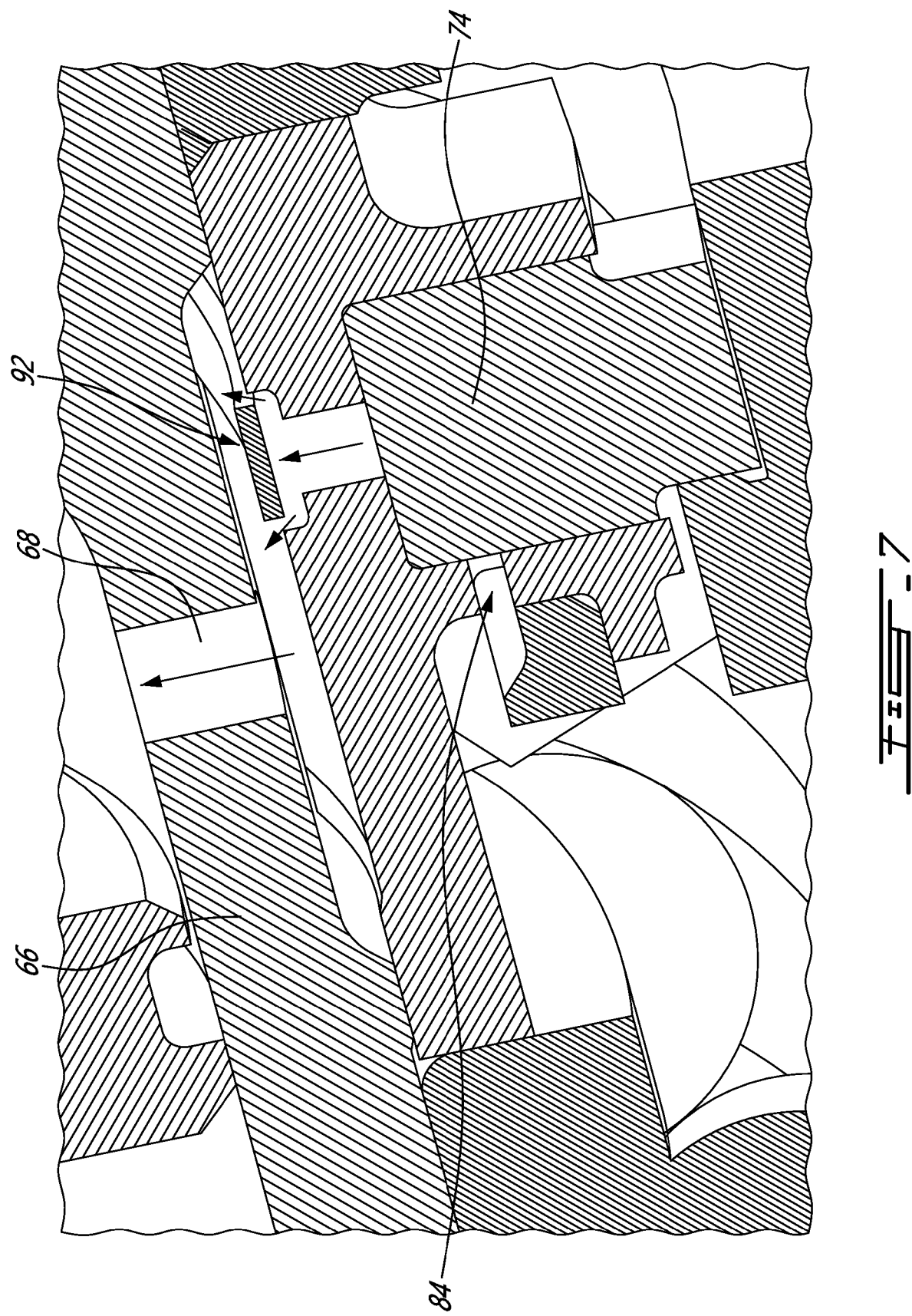

210 — Rotating the rotary assembly relative the support structure, around a rotation axis, the rotary assembly having at least one cylinder extending radially relative the rotation axis 212 — Rotating the rotary assembly including applying centripetal acceleration to at least one piston slidingly mounted in a respective one of the at least one cylinder, and sliding a distal end of the piston circumferentially against a guide extending around the rotation axis 214 — The guide exerting a radially-inward force to the piston in reaction to the centripetal acceleration, the radially-inward force pushing the piston radially inward, and the centripetal acceleration moving the piston radially outward during said rotating, as the piston is carried by the cylinder around the axis 216 — Moving the piston radially outward including opening an inlet port and allowing oil from the first oil passage into the cylinder, and said moving the piston radially inward including closing the inlet port and pumping the oil radially inwardly through an outlet port, into the second oil passage

FIG. 8

OIL PUMP FOR GAS TURBINE ENGINE AND ASSOCIATED METHOD OF PUMPING OIL

TECHNICAL FIELD

The application relates generally to gas turbine engines and, more particularly, to oil pumps therefor.

BACKGROUND OF THE ART

In some rotary mechanical assemblies, it can be desired to lubricate bearings during rotation. This can be the case, for instance, in an accessory gearbox of a gas turbine engine. While existing techniques to lubricate bearings were satisfactory to a certain degree, there remained room for improvement.

SUMMARY

In one aspect, there is provided an oil pump comprising: a support having a guide extending around an axis, a radial position of the guide relative the axis varying around the axis, between a maximum radial position and a minimum radial position, and a first oil passage formed in the support; a rotary assembly mounted to the support via support bearings, and rotatable around the axis, the rotary assembly having a second oil passage and a cylinder, the cylinder extending radially relative the axis, an inlet port fluidly connecting the first oil passage to the cylinder, and an outlet port fluidly connecting the cylinder to the second oil passage, the outlet port at a radially-inner end of the cylinder; and a piston slidingly mounted in the cylinder, a radially-outer end of the piston further slidingly engaged with the guide, wherein when the piston is engaged with the maximum radial position of the guide, the inlet port is uncovered by the piston and open, and wherein when the piston is engaged with the minimum radial position of the guide, the inlet port is covered by the piston and closed.

In another aspect, there is provided a method of pumping oil from a first oil passage formed in a support to a second oil passage formed in a rotary assembly, the method comprising: rotating the rotary assembly relative the support, around a rotation axis, the rotary assembly having at least one cylinder extending radially relative the rotation axis; said rotating the rotary assembly including applying centripetal acceleration to at least one piston slidingly mounted in a respective one of the at least one cylinder, and sliding a distal end of the piston circumferentially against a guide extending around the rotation axis; the guide exerting a radially-inward force to the piston in reaction to the centripetal acceleration, the radially-inward force pushing the piston radially inward, and the centripetal acceleration moving the piston radially outward during said rotating, as the piston is carried by the cylinder around the axis; and said moving the piston radially outward including opening an inlet port and allowing oil from the first oil passage into the cylinder, and said moving the piston radially inward including closing the inlet port and pumping the oil radially inwardly through an outlet port, into the second oil passage.

In a further aspect, there is provided a gas turbine engine comprising: an auxiliary gearbox having a support and a rotary assembly rotatably mounted to the support for rotation around a rotation axis; the support having a guide extending around the rotation axis, a radial position of the guide relative the rotation axis varying around the rotation axis, between a maximum radial position and a minimum radial position, and a first oil passage formed in the support; the rotary assembly rotatably mounted to the support via support bearings, the rotary assembly having a second oil passage and a cylinder, the cylinder extending radially relative the rotation axis, an inlet port fluidly connecting the first oil passage to the cylinder, and an outlet port fluidly connecting the cylinder to the second oil passage, the outlet port at a radially-inner end of the cylinder; and a piston slidingly mounted in the cylinder, a radially-outer end of the piston further slidingly engaged with the guide, wherein when the piston is engaged with the maximum radial position of the guide, the inlet port is uncovered by the piston and open, and wherein when the piston is engaged with the minimum radial position of the guide, the inlet port is covered by the piston and closed.

DESCRIPTION OF THE DRAWINGS

Reference is now made to the accompanying figures in which:

FIG. 2 is an oblique cross-sectional view, taken along an axial/radial plane, of an oil pump in accordance with one embodiment;

FIG. 3 is another oblique cross-sectional view, taken along a radial/transversal plane, of the oil pump of FIG. 2;

FIGS. 4 and 5 are two schematic representations of another example of an oil pump, shown in different configurations;

FIG. 6 is an oblique cross-sectional view, taken along an axial/radial plane, enlarged, of the oil pump of FIG. 2 in a first configuration;

FIG. 7 is an oblique cross-sectional view, taken along an axial/radial plane, enlarged, of the oil pump of FIG. 2 in a second configuration; and FIG. 8 is a flow chart of a method of pumping oil in accordance with an embodiment.

DETAILED DESCRIPTION

Figure 1:
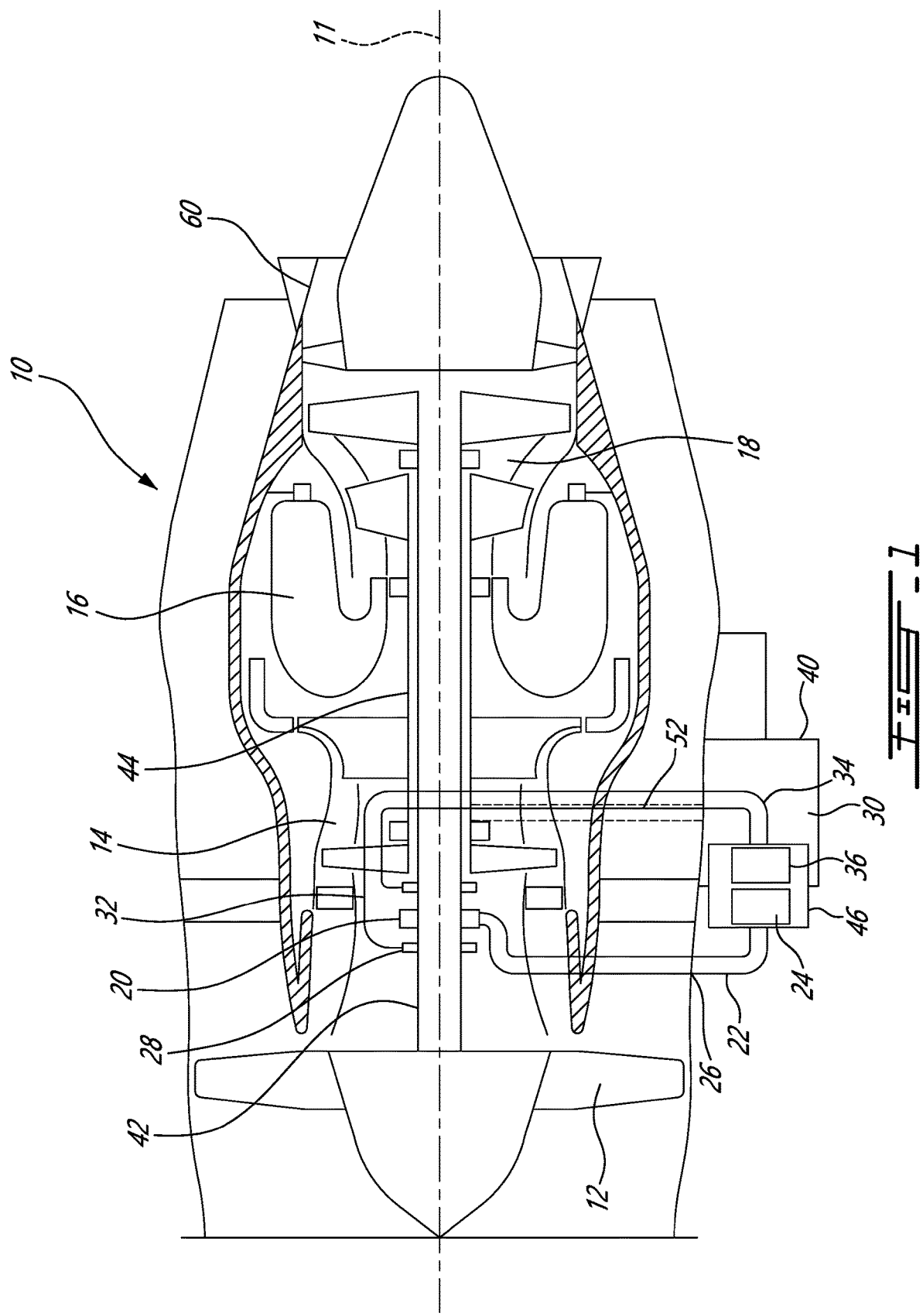
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to contain the oil. A scavenge system 30 having cavities 32, conduits 34, and one or more scavenge pumps 36, is used to recover the oil, which can be in the form of an oil foam at that stage, from the bearings 20.

The gas turbine engine also has an accessory gearbox (AGB) 40 which derives power from a corresponding one of the shafts 42, 44. The accessory gearbox 40 can be positioned in a lower portion of the gas turbine engine 10, and can have a sump lower than the oil level in an oil tank. One or more intermediary shafts and gearing can provide power to the accessory gearbox 40. In this example, a vertical intermediary shaft 52 having gears engaged with corresponding gears on the corresponding compressor/turbine rotor can be engaged, in the accessory gearbox, with a gearbox shaft, via appropriate gearing (not shown). The shaft 52 can power various accessories of the gas turbine engine 10, such as electrical generators, oil and fuel pumps, and/or hydraulic pumps through a gear train, or receive power from an engine starter, for instance. The gear train can require oil for lubrication. The oil tank 46 can be external or internal.

The accessory gearbox 40 can be installed under the main engine casing, or at another low point on the engine architecture. The oil tank can be attached to the accessory gearbox 40 or mounted above it onto the engine casing, to name two examples. A scavenge pump 36 can be used to pump oil from the sump of the accessory gearbox 40 back into the oil tank 46. The scavenge pump 36 can be powered by the output shaft of the accessory gearbox 40.

Rotary assemblies of the gas turbine engine, such as a shaft assembly of the accessory gearbox, or a shaft assembly of the core engine, may benefit from the distribution of oil to the bearings. In some cases, supplying the oil to the bearings from a radially outward source (relative the axis of rotation) can be satisfactory. In other cases, supplying the oil to the bearings from a radially outward source may not be satisfactory, and it may be preferred instead to supply the oil from a radially inward source, using centripetal acceleration and/or oil pressure to deliver the oil to the bearings. There can be a challenge in conveying the oil from a radially outward, non-rotating oil passage, to an oil passage formed in the rotary assembly, as the oil will naturally be driven radially outwardly during rotation of the rotary assembly due to centripetal acceleration.

In one embodiment, this challenge can be overcome using an oil scoop integrated to the rotary assembly, and which is rotated inside an oil plenum formed between the rotary assembly and the support, during rotation of the rotary assembly. Due to its circumferential motion and its geometry, the scoop can, to a certain extent, force the oil to enter an oil passage of the rotary assembly, from where it can be conveyed to an outlet and to bearings or gear assemblies. While this approach can be satisfactory to a certain degree, it may not be suitable for all embodiments. Indeed, in some embodiments, it may not be deemed very efficient, or may not allow to pressurize the oil in a satisfactory manner in the oil passage of the rotary assembly.

An example of a different approach is presented in FIG. 2. In the specific example of FIG. 2, an oil pump 60 integrated to an accessory gearbox 40 is presented, though it will be understood that the technology can alternately be applied to other contexts in different embodiments. More specifically, in this example, a support 62 is provided. An oil passage 64, which will be referred to herein as a first oil passage 64 for ease of later reference, is formed in the support 62. A rotary assembly 66 is also provided. An oil passage 68 which will be referred to herein as a second oil passage 68 for ease of later reference, is formed in the rotary assembly 66. The rotary assembly 66 is rotatably mounted to the support 62 for rotation around an axis 70 via support bearings 72. The oil in the first oil passage 64 can be pressurized to a certain extent, and an objective can be to convey the oil from the first oil passage 64 to the second oil passage 68, against the bias of the centripetal acceleration which can be imparted to the oil by the rotary assembly 66.

The technique used in FIG. 2 involves one (or more) cylinders 74 (best seen in FIG. 3) formed in the rotary assembly, and more specifically in a cylinder block 76 component thereof in this case. The cylinder(s) 74 can be generally cylindrical and radially oriented relative an axis 70 of rotation of the rotary assembly 66. The cylinder(s) 74 can (each) house a respective piston 78. The piston 78 can also have a generally cylindrical shape and be configured to slide within the cylinder 74, along a length of the cylinder 74. It will be understood that while the cylinders 74 may extend perfectly radially relative the axis 70 of rotation, in some embodiments it can be preferred that they extend not perfectly radially, such as radially but with a certain degree of sloping in the axial, circumferential, or both the axial and circumferential orientations, and such partially oblique movement will also be referred to generally as "radial" in this specification. Accordingly, when the rotary assembly 66 rotates relative the support 62, the rotary motion will be conveyed to the pistons 78 by the cylinder block 76. When the pistons 78 move circumferentially, they will be subjected to centripetal acceleration, which forces the pistons 78 radially outward.

In this embodiment, a guide 80 is used to provide a reactive, radially-inward force onto the pistons 78, and thus limit the radially-outward movement of the pistons 78. The shape of the guide 80 can perhaps be better understood with reference to FIG. 3.

The guide 80 can convey a reaction force to the centripetal force. This reaction force can be used not only to limit the radially-outward movement of the pistons 78, but further to push the pistons 74 radially inwardly in one or more sections of the rotary path. For instance, the guide 80 can be generally cylindrical around a guide axis 82 parallel the rotation axis 70, but offset (eccentric) relative the rotation axis 70, as shown in FIG. 3. Accordingly, when the rotary assembly 66 rotates, the centripetal acceleration (which can alternately be referred to as centrifugal force) can cause the pistons 74 to maintain contact with the guide 80. However, as the radial distance between the guide 80 and the rotation axis 70 varies along the circumferential orientation, around the axis 70, the pistons 74 can be forced to move back and forth, in the radial orientation, by the guide 80 during the rotation. It will be understood that while a specific design using an eccentric configuration is shown, which causes a single back and forth movement per revolution, more complex geometries can be used in alternate embodiments, such as geometries causing two, or more, back and forth movements of the piston per revolution (full rotation).

As seen in FIG. 3, there can be more than one cylinder 74 housing respective pistons 78, and the cylinders 74 can be circumferentially interspaced from one another. The cylinders 74 in addition to the first one can be referred to as additional cylinders, and the pistons 78 in addition to the first one can be referred to as additional pistons. Each piston 78 is slidingly mounted in a respective cylinder 74.

The back and forth movement of the piston 174 stemming from the presence of the guide 180, the cylinder block 176 and the rotary motion is schematized in FIGS. 4 and 5. When the piston 174 is slid against a radially broadening section of the guide 180, it moves radially outward, such as in the transition between FIG. 4 and FIG. 5, whereas when the piston 174 is slid against a radially narrowing section of the guide 180, it moves radially inward, such as in the transition between FIG. 5 and FIG. 4.

More specifically, the radial position of the guide 180 relative the axis can vary depending on the circumferential location around the axis 170. In FIG. 4, the guide 180 is shown at a first circumferential position around the axis 170 corresponding to a minimum radial position, where the guide 180 is radially closest to the axis 170. In FIG. 5, the guide 180 is shown at a second circumferential position around the axis 170 corresponding to a maximum radial position, where the guide 180 is radially farthest from the axis 170. The piston 174 is slidingly mounted in the cylinder 178, for movement in the radial orientation, and a radially-outer end of the piston 174 is further slidingly engaged with the guide 180. When the piston 174 is engaged with the maximal radial position of the guide 180, the inlet port 184 is uncovered by the piston 174 and open, whereas when the piston 174 is engaged with the minimum radial position of the guide 180, the inlet port 184 is covered by the piston 174 and closed. The piston 174 can be said to have a first end 186, or distal end 186, slidingly engaged with the guide 180, and a second end 188, or proximal end 188, radially opposite the distal end 186. During use, the proximal end 186, is engaged with the oil inside the cylinder to apply pressure to the oil during the radially inward movement.

The portion of the assembly described up to now illustrates how a reciprocating piston 74, 174 can be achieved between the support 62 and the rotary assembly 66. Now, as further schematized in FIGS. 4 and 5, the first oil passage 164 can fluidly communicate with an inlet port 184 in the cylinder block 176. The inlet port 184 can be positioned along the path of displacement of the piston 174, in a manner that the piston 174 can alternately uncover/open, or cover/close the inlet port 174 based on its radial position in the cylinder 178. It may be desired to position the inlet port 184 close to the maximum, radially-outward, position of the proximal end 188 of the piston 174 (e.g. the position shown in FIG. 5. An outlet port 190 can be provided at the radially-inner end of the cylinder 178, such that when the piston 174 is pushed radially-inwardly by the guide 180 during the rotary motion, the piston 174 closes the inlet port 184, and pushes against the oil in the cylinder 178, forcing the oil out the outlet port 190. The outlet port 190 can be at a radially-inner end of the cylinder 178. The outlet port 190 can fluidly communicate with the second oil passage 168, and the second oil passage 168 can convey the oil from there to a location of use, such as a bearing, gear component, or the like.

A one-way valve 192 can be used to assist in the pumping action. More specifically, the one-way valve 192 can be associated to the outlet port 190, and can be biased in a manner to prevent oil from circulating back from the second oil passage 168 into the cylinder 178 due to centripetal acceleration, while yielding to oil pressure in the cylinder 178 when the piston 174 is pumping the oil through the outlet port 192.

FIGS. 6 and 7 present more detail about the example embodiment. In this example, the first oil passage 64 can lead to a plenum 94 between the rotary assembly 66 and the support 62. The inlet port 84 can connect the plenum 94 in fluid communication to the cavity of the cylinder 78. In this specific embodiment, the plenum 94 is further in fluid communication with one or more other components of the auxiliary gearbox, such as a proximal bearing.

In FIG. 6, the piston 74 is shown at a circumferential position associated to a maximum radial position of the guide 80. Since the guide 80 is a cylindrical and eccentric in this embodiment, this location corresponds to a direction of offset between the rotary axis 70 and the guide axis 82, and can thus be said to be a circumferential position around the rotary axis 70 which intersects the guide axis 82. At this position, the piston 74 is at its maximally outward position, and uncovers the inlet port 84, which is shown open. The oil pressure in the cylinder 78 is at or close to a minimum, and the valve 92, embodied here as a flat annular ring engaged with an annular groove at a radially-inwardly facing surface of the cylinder block, closes off the outlet port due to the spring bias. More specifically, the annular ring can be biased radially-outwardly, and the outlet port can be in fluid communication with the annular groove.

In FIG. 7, the piston 74 is shown at a circumferential position associated to a minimum radial position of the guide 80. Again, since the guide 80 is cylindrical and eccentric in this embodiment, this location can correspond to a direction opposite to the guide axis 82. At this position, the piston 74 is at its maximally inward position, and covers the inlet port 84, which is shown closed. The oil pressure in the cylinder 78 may be at or close to a maximum, due to the pressure imparted by the piston 74, and the valve 92 is pushed open, against the bias, allowing the oil through the outlet port 92, and into the second oil passage 68 defined within the rotary assembly 66.

As shown in the figures, the cylinder block, pistons, valve and shaft may all spin as one inside an eccentric guide. Centrifugal force may cause the pistons to maintain contact with the eccentric guide forcing them to translate in the cylinders as they rotate. The movement can drive a pumping action with oil introduced into the cylinder through an inlet port which can be fed by a jet. The oil pressure in the cylinder forces the valve, on the inner diameter, to open allowing oil to flow into the inner diameter of the shaft. The pumped volume can be changed by varying the eccentric amplitude, number of eccentrics, number of cylinders, cylinder volume and/or RPM. The port is uncovered as the piston passes the largest diameter of the eccentric guide, oil flows in, and the piston is forced to a smaller diameter covering the port. The oil pressure in the cylinder forces the valve, on the inner diameter, to open allowing oil to flow into the inner diameter of the shaft.

As represented in FIG. 8, a method of pumping oil from a first oil passage formed in a support to a second oil passage formed in a rotary assembly can include a number of steps. First, rotating 210 the rotary assembly relative the support, around a rotation axis, the rotary assembly having at least one cylinder extending radially relative the rotation axis. Second, the rotating of the rotary assembly including applying 212 centripetal acceleration to at least one piston slidingly mounted in a respective one of the at least one cylinder, and sliding a distal end of the piston circumferentially against a guide extending around the rotation axis. Third, the guide exerting 214 a radially-inward force to the piston in reaction to the centripetal acceleration, the radially-inward force pushing the piston radially inward, and the centripetal acceleration moving the piston radially outward during said rotating, as the piston is carried by the cylinder around the axis. Fourth, said moving the piston radially outward including opening 216 an inlet port and allowing oil from the first oil passage into the cylinder, and said moving the piston radially inward including closing the inlet port and pumping the oil radially inwardly through an outlet port, into the second oil passage.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in an alternate embodiment, the pump can be used to pump other liquids than oil. Moreover, in an alternate embodiment, the pump can be used in an other mechanical assembly than a gas turbine engine, such as an automotive engine, or other machine having a rotary assembly rotatably mounted in a support. Yet further modifications could be implemented by a person of ordinary skill in the art in view of the present disclosure, which modifications would be within the scope of the present technology.

The invention claimed is:

1. An oil pump comprising:
   a support having a guide extending around an axis, a radial position of the guide relative the axis varying around the axis, between a maximum radial position and a minimum radial position, and a first oil passage extending through the support;
   a rotary assembly mounted to the support via support bearings, and rotatable around the axis, the rotary assembly having a second oil passage and a cylinder, the cylinder extending radially relative to the axis, an inlet port fluidly connecting the first oil passage to the cylinder, and an outlet port fluidly connecting the cylinder to the second oil passage, the outlet port at a radially-inner end of the cylinder;
   a piston slidingly mounted in the cylinder, a radially-outer end of the piston slidingly engaged with the guide, wherein when the piston is engaged with the maximum radial position of the guide, the inlet port is uncovered by the piston and open, and wherein when the piston is engaged with the minimum radial position of the guide, the inlet port is covered by the piston and closed; and
   a one-way valve at the outlet port, the one-way valve preventing passage of oil from the second oil passage to the cylinder while yielding to pressure and allowing passage of oil from the cylinder to the second oil passage, the one-way valve having a ring engaged in a radially-inwardly facing annular groove formed in the rotary assembly, the ring and the annular groove extending around the axis, the outlet port being in fluid flow communication with the annular groove, the ring being radially-outwardly biased against the annular groove to close the outlet port and configured to yield to oil pressure from the outlet port.

2. The oil pump of claim 1 wherein the rotary assembly further has a shaft extending along the axis, the second oil passage extending along at least a portion of a length of the shaft.

3. The oil pump of claim 1 wherein the cylinder is a first cylinder, further comprising at least one additional cylinder, and the piston is a first piston, further comprising an additional piston slidingly engaged in each one of the at least one additional cylinder.

4. The oil pump of claim 1 wherein the piston has a distal end slidingly engaged with the guide, and a proximal end radially opposite the distal end and applying pressure to oil in the cylinder when moved radially-inwardly by the guide during the rotation of the rotary assembly around the axis.

5. The oil pump of claim 1 wherein the guide is cylindrical around a guide axis, the guide axis being parallel to, and offset from, the axis around which the rotary assembly rotates.

* * * * *